Dec. 19, 1961     L. P. SHILDNECK     3,014,139
DIRECT-COOLED CABLE WINDING FOR ELECTROMAGNETIC DEVICE
Filed Oct. 27, 1959     2 Sheets-Sheet 1

INVENTOR
LLOYD P. SHILDNECK
BY W. C. Crutcher
HIS ATTORNEY

Dec. 19, 1961  L. P. SHILDNECK  3,014,139
DIRECT-COOLED CABLE WINDING FOR ELECTROMAGNETIC DEVICE
Filed Oct. 27, 1959  2 Sheets-Sheet 2

INVENTOR
LLOYD P. SHILDNECK
BY W. C. Cutcher
HIS ATTORNEY

United States Patent Office 3,014,139
Patented Dec. 19, 1961

3,014,139
DIRECT-COOLED CABLE WINDING FOR ELECTROMAGNETIC DEVICE
Lloyd P. Shildneck, Marblehead, Mass., assignor to General Electric Company, a corporation of New York
Filed Oct. 27, 1959, Ser. No. 848,942
12 Claims. (Cl. 310—64)

This invention relates to an improved continuous winding for an electromagnetic device, and more particularly it relates to a winding employing an improved form of flexible insulated conductor for the laminated armature core of a dynamoelectric machine, such as a large turbine-driven generator which will have an easily controllable leakage reactance. The arrangement is especially adapted for direct-cooling of the conductor strands.

In the usual arrangement for the winding of an electromagnetic device which uses a flux-carrying iron core, such as the armature core of a generator, the insulated conductor is generally rectangular in cross-section in order to permit its radial insertion and snug fit in rectangular slots in the core. The core is usually built up from a large number of thin laminations in order to reduce undesirable eddy currents. The laminations are generally punched from sheet metal with a number of rectangular holes intersecting one edge of the lamination. This will result in a series of open-sided longitudinal slots when multiple laminations are stacked to form the stator core. Since the conductor is inserted radially into the slot thus formed, a slot with parallel sides has hitherto been the most practical. A wedge or similar device must then be used to retain the conductors in the slot.

Since the conductor is normally inserted radially into the slot, the width of the slot is necessarily determined by the width of the conductor. The circumferential distance between the sides of each slot represents an air gap having a very high magnetic reluctance as compared to the reluctance of the laminated armature core iron. The reluctance to magnetic flux of the opening which is left after insertion of the conductor is proportional to the ratio of the circumferential width of the opening to the radial depth of the opening. In the event it is desired to vary the leakage reactance of the dynamoelectric machine, the only practical way to decrease the reluctance of this opening is to increase the radial depth of the slot, since the width of the slot is predetermined. This often results in an overall diameter of the core which is larger than would otherwise be necessary if the leakage reactance could be controlled in a different manner.

With rectangular conductors or "bars," the conductor strands are insulated from one another with relatively light strand insulation and may for instance be arranged to lie on top of one another, disposed in one or more radial columns. The assembled strands are then covered with heavy "ground insulation" to insulate the strands from the iron in the armature core. A typical arrangement for such bars in an armature core may be seen in U.S. Patent No. 2,613,238 issued to R. W. Wieseman on October 7, 1952, and assigned to the assignee of the present application.

A special problem arising in the construction of a large generator is the need for "transposing" the separate strands in the conductor, so that each strand occupies various positions in the bar, in order to equalize the potential between strands. This is necessary since otherwise the location of some strands in an untransposed bar would be such that more voltage would be induced in them than in other strands, due to the non-uniformity of the magnetic field. This voltage imbalance is avoided if the strands are transposed, as by progressively changing their location along the bar. Use of a bar of rectangular cross-section causes this to be quite a complicated procedure. An example of a machine to accomplish this transposition may be seen in U.S. Patent No. 2,234,996 issued to Welsh et al. on March 18, 1941, and assigned to the assignee of the present application.

A fairly recent development in large capacity turbine-generators is the use of "direct-cooling," in which the conductor strands themselves are contacted by a fluid coolant flowing within the ground insulation in order to more effectively carry off the heat generated in the windings. One method to accomplish direct-cooling is through the use of hollow strands which transport the coolant so that it can effectively absorb heat from each strand. A relatively high coolant pressure differential is required to force the coolant through the individual strand conduits. Such a construction is shown in U.S. Patent No. 2,695,368 issued to C. E. Kilbourne on November 23, 1954, and assigned to the assignee of the present application.

It may also be noted that the rectangular cross-section of the conventional bar results in four small-radius corners which are difficult to protect from mechanical damage in handling during manufacture. Also the dielectric stress is considerably increased at these corners, requiring a thicker ground insulation than would be the case for a conductor with more uniform dielectric stress.

In very large generator stator windings, the conductor bars are quite heavy and are semi-rigid or rigid depending on the type of insulation. Thus the windings must be manufactured in separate "half-turns" and shaped with the proper curvature in the end turn portions so as to connect with a mating half-turn to form a complete turn. The individual strands of the bar must then be brazed together or otherwise suitably connected, and the connections taped or otherwise covered to provide a suitable ground insulation at the joints. Such a procedure is time-consuming and costly.

Accordingly, one object of the present invention is to provide an improved winding for an electromagnetic core employing a flexible conductor.

Another object of the invention is to reduce the necessity for connecting short lengths of conductor bars and insulating the connections by providing a continuous winding extending both in the slot portions and in integral end turn portions.

A further object is to provide an improved conductor construction suitable for "direct-cooling" of the conductor strands which offers very low "head loss" as compared to constructions where the cooling fluid is subdivided to flow through each strand.

Yet another object is to provide an improved winding with a special conductor which greatly facilitates the transposition of the conductor strands both in the longitudinal core slots and in the end turns.

Another object is to provide an improved method for winding the laminated core of a large dynamoelectric machine.

Still another object is to reduce the thickness required in the ground insulation, by providing a conductor having a more nearly uniform dielectric stress.

A further object is to provide a laminated electromagnetic core structure which largely or completely obviates the need for slot wedges or other separate slot closing means to prevent the windings from coming out of the slots.

A still further object is to provide a stator core in which the leakage reactance may be easily controlled without the necessity for increasing the radial depth of the conductor slots or the overall stator diameter.

Another object is to provide a dynamoelectric machine with an integral fluid-cooled phase belt requiring only external electrical and coolant connections.

The subject matter which is regarded as the invention is particularly pointed out and distinctly claimed in the concluding portion of this specification. The invention, both as to organization and method of practice, together with further objects and advantages thereof, may best be understood by reference to the following description taken in connection with the accompanying drawing in which:

Generally stated, the invention is practiced by providing a flexible conductor of generally circular cross-section which has flexible ground insulation surrounding the conductor strands which, in turn, are disposed in a ring about the axis of the conductor. The portions of the strands adjacent to the axis of the conductor are removed in order to provide a central conduit for direct contact by a suitable coolant. Transposition is accomplished by simply imparting a helical twist to the conductor strands, about the axis of the cable. The core is "wound" by passing the flexible conductor longitudinally back and forth through aligned holes of generally circular cross-section in the laminations.

Figure 1:
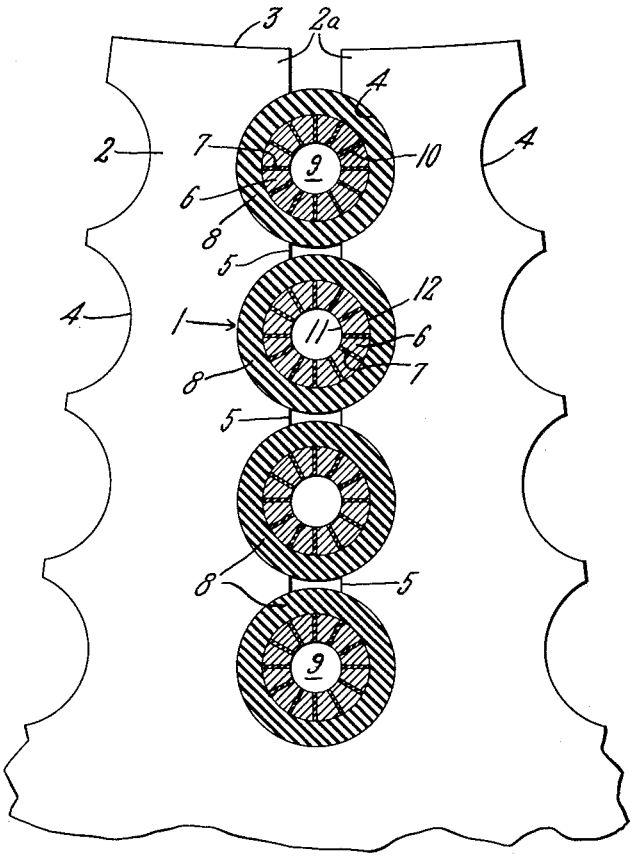
FIG. 1 illustrates a cross-section taken through a generator stator core showing cross-sections of the slot portions of the conductors which are longitudinally disposed in the core.

Referring now to FIG. 1 of the drawing, four similar electrical conductors 1 are shown in cross-section, disposed in a laminated core 2. It will be understood that core 2 is made up of many thin punchings of magnetically permeable material such as a suitable silicon steel to create a path for the magnetic flux. The arcuate inner edge 3 of core 2 defines the bore of the generator stator within which the rotor turns. Core 2 is provided with openings 4 of circular cross-section, as will be obvious from the drawing. In order to provide a winding substantially filling these conduits, the winding is inserted longitudinally from the ends of holes 4, since the constricted opening 2a in the core prevents transverse insertion in the customary manner.

It may be noted that an opening 2a between the top conductor hole 4 and the arcuate edge 3 defining the stator bore is provided primarily for controlling the "leakage reactance" of the core. Of lesser effect, but for the same reason, openings 5 are provided connecting the other adjacent circular openings 4. Openings 2a, 5 are very useful for controlling the leakage reactance of the core to the magnetic flux by varying the ratio of the radial depth of the openings to their width. Since the radial and circumferential dimensions of the gap 2a are no longer in any way dependent upon the size of the conductor, the dimensions of gap 2a may be readily selected so as to determine the leakage reactance of the core.

Turning now to the construction of the conductor 1, it is seen that it consists of a plurality of strands 6, individually separated by strand insulation 7, which are surrounded in their entirety by ground insulation 8. The cross-section of each strand 6 is a circular ring sector in the embodiment shown, although it could also be trapezoidal if enough strands were used. The radially inner surfaces of strands 6 define a central conduit 9 which may be advantageously used to contain coolant for direct-cooling of the strands. The strands 6 cooperate with strand insulation 7 to prevent appreciable leakage of the coolant radially outward between strands.

The ground insulation 8 is composed of a flexible insulating material, one suitable material being a "silicone rubber," which possesses both the desired flexibility and good resistance to the temperatures encountered in modern generators.

The strands 6 may be of copper and are placed so as to form a ring. The non-parallel surfaces 10 of each strand will therefore lie along radial lines from the conductor axis. The inner and outer surfaces 11, 12 respectively of strands 6 are arcuate as shown in the drawing in order to form a smooth passage for the coolant and in order to form a smooth circular surface for receiving ground insulation 8, but this is not absolutely necessary since manufacturing economy may dictate that inner and outer surfaces 11 and 12 be flat, and substantially uniform dielectric stress will be secured near these outer flat surfaces, if the number of strands is kept reasonably large.

The strand insulation 7, which needs be bonded only to the radial sides 10 of every other strand 6 by a suitable pressure-sensitive adhesive or by chemical bonding means, preferably possesses a low coefficient of friction so that strands 6 may slide longitudinally very slightly with respect to one another. In lieu of low friction insulation, separate low friction material could be used between insulated strands to aid the sliding action. Such an action greatly aids in the flexibility of the conductor, the importance of which will be later explained. Two suitable materials for strand insulation 7 are those known to the trade as "Formex" or "Teflon," although other commercially obtainable equivalent materials might be used.

In the drawings, the strand insulation 7 is shown as separating only the radial sides of strands 6, although strands 6 could also be completely covered by a light insulation. In the construction shown in FIG. 1, however, the inner surfaces of strands 6 are exposed in order that the coolant flowing in conduit 9 will function more effectively to absorb heat by conduction from the strands. To this end, the coolant chosen should have sufficient dielectric characteristics to prevent current from flowing between the exposed inner surfaces and to prevent objectionable losses in the coolant.

A suitable conductor, having sufficient flexibility to be bent easily on a 15-inch radius, can be constructed using twelve strands in the ring, each strand being approximately .175 inch average radial thickness and insulated from adjacent strands with Teflon. A suitable thickness for the ground insulation 8 for this conductor is silicone rubber, .150 inch thick, forming a finished conductor of about 1¼ inches in diameter.

Figure 2:
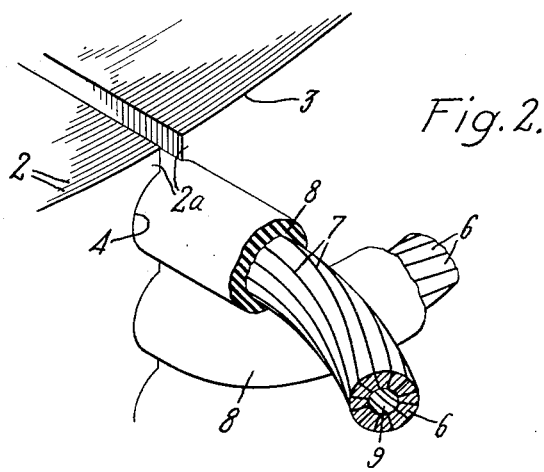
FIG. 2 is a perspective view, partly in section, taken at one end of the stator core.

It is, of course, well known that twisting a stranded cable or rope gives it increased flexibility, and this principle is utilized in the present invention to give added flexibility to the conductor. FIG. 2 is a view at the end of the stator with the insulation removed to show how the strands are spiraled. The twistng, however, also performs the necessary function of electrically "transposing" the strands 6. Since a uniform circumferential displacement of the ring of strands along the conductor will cause them to become exposed to different intensities of the magnetic field, the potentials generated between strands will be minimized. This spiraling or transposing is utilized in the core and also acts to accomplish transposition in the end turn portions 18 projecting from the core (see FIG. 3). In the specific embodiment described, a pitch of ten inches, i.e. one complete revolution of any given strand with respect to the conductor axis every ten inches, both provides a suitable transposition for the strands and also provides needed flexibility in the conductor.

Figure 3:
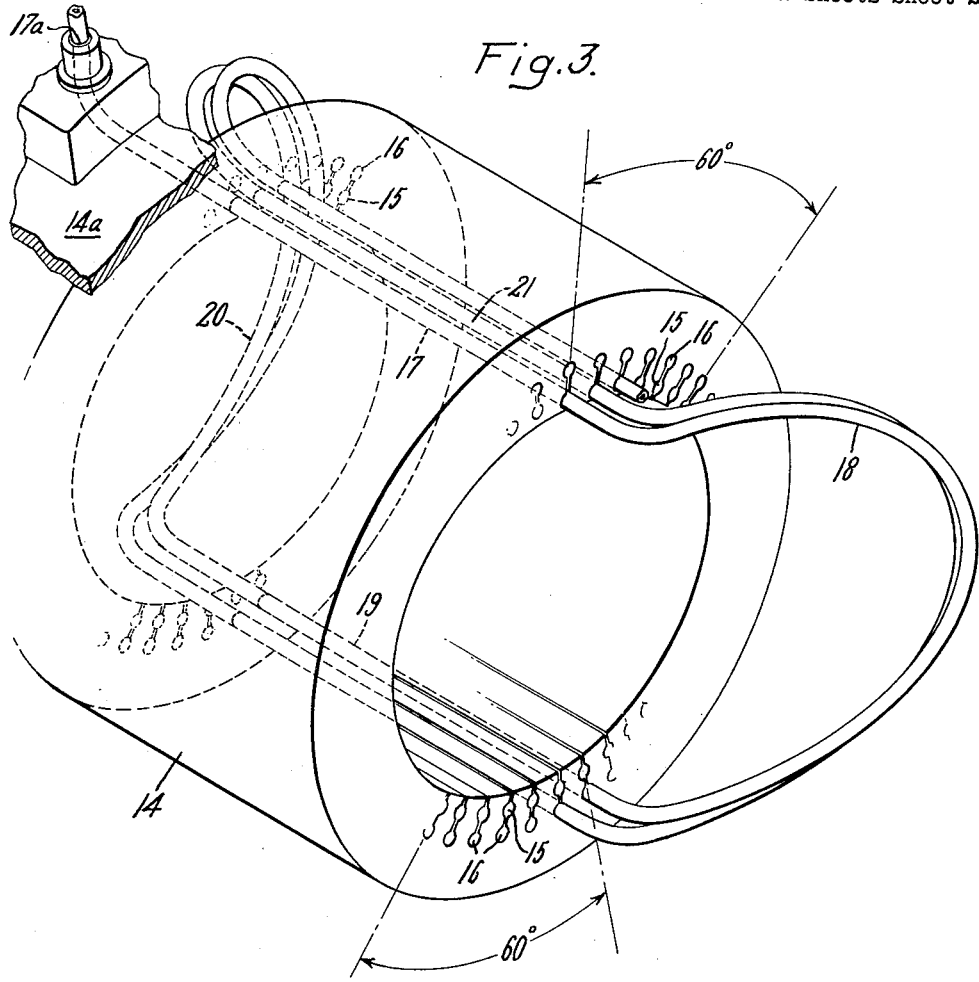
FIG. 3 is a perspective diagrammatic representation of a partially wound stator core.

FIG. 3 is a diagrammatic representation of a partially-wound stator core utilizing the invention. There, a laminated stator core 14 is disposed in a casing indicated by the fragmentary portion 14a and is shown having inner cylindrical conductor passages 15 and outer cylindrical conductor passages 16. In this diagrammatic representation, only two radially spaced rings of conductor passages 15, 16 have been shown rather than the four rings of passages as in FIG. 1 in order to simplify the drawing.

In FIG. 3, a portion of a "phase belt" has been wound from a single length of flexible conductor. In many modern machines, the windings are separated into six "phase belts" which are then connected externally to produce, for example, a three-phase generator. With the disclosed invention, it is possible to wind a complete "phase belt" without reverting to piercing the "slot-lying" portions or half-turns of the conductor together by connecting and insulating to form the end turns. Thus the integrity of the end turn insulation is preserved and a great saving in labor is accomplished. In FIG. 3, the winding enters the casing at 17a and commences as a "slot" portion 17 passing through the inner passage 15, an integral end-turn portion 18 which passes around approximately one-half of the stator circumference to enter the outer conductor passage 16 on the opposite side of the core. The conductor then continues as a "slot" portion 19 and then again traverses to the diametrically opposite side of the stator core 14 by means of the end turn portion 20 at the opposite end to again enter an inner passageway 15 adjacent the previously wound inner passage to form a new "slot" portion 21. The conductor continues as an integral member until it has progressively moved around the stator circumference for 60° in the inner passages 15 and 60° in the outer passages 16 to form a complete phase belt.

Figure 4:
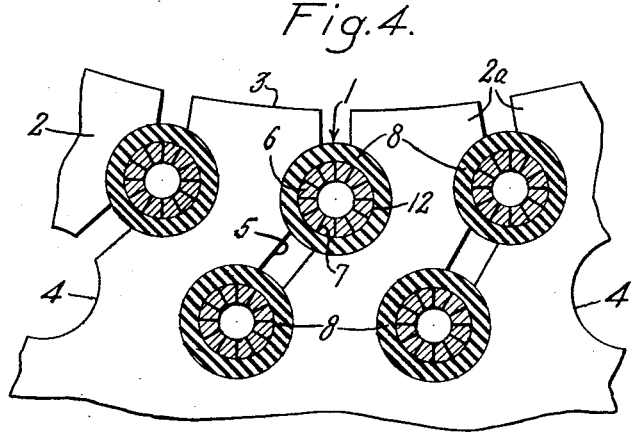
FIG. 4 is a cross-section taken through the stator core illustrating a modification of the invention.

FIG. 4 is a cross-sectional view, similar to FIG. 1, illustrating a modification of the invention. Whereas, in the past, the disposition of the conductors has been necessarily related to the requirement of inserting the conductor radially into the slot, it has been the practice for the conductors to lie along radial lines emanating from the stator axis. Thus as the conductors get progressively farther from the axis, they become less efficient.

As will be obvious from FIG. 4, the use of longitudinally inserted conductors allows a greater flexibility to the placement of the conductors, allowing them to be disposed in a matrix instead of constraining them to remain along radial lines. It will be apparent that this added flexibility allows a reduction in the diameter of the stator, and when coupled with the added feature of easily controllable leakage reactance by means of gaps 2a, 5, permits more efficient placement of the windings in the core.

The operation and method of winding a laminated core with my improved electrical conductor will now be described. The cable is quite flexible, both due to the fact that flexible ground insulation is used and due to the fact that the strands are twisted. Since a given strand, by reason of the "twisting," occupies both the "tension side" and the "compression side" of the conductor as it is bent, resistance to such bending comes primarily from the friction between strands as they slide across one another. The use of low friction insulation between strands greatly reduces this sliding friction, thus aiding in bending the conductor.

The core of the electromagnetic device, for example, the generator of FIG. 3, is "wound" by threading the conductor longitudinally back and forth through the holes in the aligned laminations, as compared with the conventional practice of inserting short lengths of conductor transversely into slots which necessarily must have an open side to accommodate the greatest width of the conductor. My flexible conductor may be readily coiled on a reel or a spool so that sufficient length to wind a complete phase belt of the generator may be accommodated. The conductor is pulled through a hole in the core and is then doubled back and pulled through another hole in the other direction. A suitable "cable puller" can be effectively utilized for this procedure.

This procedure is repeated until a complete phase belt has been put in place. The spiral transposition of the conductor strands allows the reversal of direction to be made at the end of the generator to form the end turns without difficulty, since the conductor can readily be simultaneously bent and twisted to accomplish a short-radius bend.

Since a complete phase belt may thus be wound without separate connections being necessary in the end turns, the phase belt leads may be led out through the casing, and all electrical connections (and also the coolant connections, if desired) may be made outside the generator casing. This greatly simplifies the problems where direct cooling is desired, since there are no connections inside the casing from which leakage can occur. Moreover, since the coolant is transported in a central hole 9 in the conductor rather than through a number of holes in the individual strands, the pressure drop is not great and pumping losses are greatly reduced.

Since the holes 4 forming the cylindrical winding conduits in the laminations do not necessarily have to be open at the edge of the lamination for transverse insertion of the conductor, it can be appreciated that slot wedges or other such means are not necessary to hold the conductor in position. Also, since the conductors do not have to be inserted into the slots in a fixed sequence, as is usually the case with transverse insertion, greater flexibility and freedom in winding patterns is afforded. Likewise, the conductor bars need not be placed to lie along radial lines; a staggered arrangement of the holes 4 in the core, similar to a matrix, becomes possible, as shown in FIG. 4, thus reducing the core diameter.

It may also be noted that, due to the absence of small-radius bends in the ground insulation 8, as is required at the corners of rectangular conductors, a lower dielectric stress exists across the ground insulation 8. This allows the use of thinner insulation for the same electrical voltage to ground.

The symmetrical disposition of the strands facilitates strand transposition, in addition to providing a natural conduit for direct cooling of all strands by passing coolant through the center of the conductor.

While there has been described herein a preferred embodiment of the invention, it will be understood that various modifications may be made. It is intended to cover in the appended claims all such modifications as fall within the true spirit and scope of this invention.

What I claim as new and desire to secure by Letters Patent of the United States is:

1. A flexible electrical conductor for use in the winding of an electromagnetic device comprising a plurality of lightly insulated conductive strands circumferentially disposed and uniformly radially spaced with respect to the conductor axis, each of said strands having a cross-section with opposite sides defined by radial lines from the conductor axis, said strands each describing a helix about the conductor axis whereby electrical transposition of the strands is accomplished and mechanical flexibility is imparted to the conductor, and flexible insulating means covering said plurality of strands to provide a flexible conductor of substantially circular cross-section.

2. A flexible conductor in accordance with claim 1 including means having a low coefficient of friction disposed between the radial sides of said conductive strands.

3. A flexible conductor in accordance with claim 2 where the radially innermost surfaces of said conductive strands define a central conduit for transporting coolant fluid in direct contact with the strands.

4. A flexible electrical conductor for use in the winding of an electromagnetic device comprising a plurality of lightly insulated conductive strands circumferentially disposed and uniformly radially spaced with respect to the conductor axis, each of said strands having a cross-section defined by first and second radial lines and by first and second radially spaced concentric arcs taken from the conductor axis, said plurality of strands being spiraled as a unit along the conductor axis whereby transposition of the strands is accomplished while added flexibility is imparted to the conductor, and flexible insulating means covering said plurality of strands to provide a flexible conductor of substantially circular cross-section.

5. A flexible electrical conductor for use in the winding of an electromagnetic device comprising a plurality of conductive strands circumferentially disposed and uniformly radially spaced with respect to the conductor axis, each of said strands having a cross-section defined by first and second radial lines and by first and second radially spaced concentric arcs taken from the conductor axis, strand insulation means having a relatively low coefficient of friction disposed between said strand radial sides, said plurality of strands being uniformly spiraled as a unit along the conductor axis, whereby transposition of the strands is accomplished and added flexibility is imparted to the conductor, and flexible insulating means covering said plurality of strands to provide a conductor of substantially circular cross-section.

6. A flexible conductor in accordance with claim 5 where the first inner arcs of each strand define a smooth circular central conduit for transporting coolant fluid in direct contact with the strands.

7. The method of winding the core of an electromagnetic device comprising the steps of providing a laminated core defining a plurality of spaced axial holes of substantially circular cross-section, providing a flexible electrical conductor, said conductor including a plurality of lightly insulated conductive strands circumferentially disposed and uniformly radially spaced with respect to the conductor axis, each of said strands having a cross-section with opposite sides defined by radial lines from the conductor axis, and said plurality of strands being uniformly spiraled as a unit along the conductor axis whereby transposition of the strands is accomplished, and flexible insulating means covering said plurality of strands to provide a conductor having a substantially circular cross-section, passing said flexible conductor longitudinally through one of said axial holes normal to the core laminations, reversing the direction of the flexible conductor by bending, passing the conductor through another axial hole normal to the core laminations, and continuing this procedure until a desired portion of the laminated core is wound.

8. The method in accordance with claim 7 where said strand insulation includes a plurality of strips of insulating material having a low coefficient of friction disposed between the radial sides of said conductive strands and where the radially innermost surfaces of said conductive strands are uninsulated and cooperate to define a central conduit for the flow of coolant in direct contact with the conductive strands.

9. A stator for an electromagnetic device comprising a laminated core member defining a plurality of spaced longitudinal circular holes extending axially through the core member, and a winding disposed in said holes and having a plurality of phase belts each comprising a single length of flexible multi-strand cable of substantially circular cross-section and having a first portion disposed in one of said holes, at least one other portion disposed in another of said spaced holes, and an intermediate portion connecting said first and second portions and forming one end turn portion of the phase belt, said cable including continuous flexible outer insulation both in the hole-lying portions and in the end turn portions.

10. A stator in accordance with claim 9, in which the ends of each single length of cable defining a phase belt project from the stator casing, whereby all cable joints are disposed exteriorly of the stator casing.

11. A stator in accordance with claim 9, in which the cable comprises a circular row of conductive strands defining a central longitudinal coolant passage, strand insulation means of low friction material disposed between each pair of abutting strands to promote cable flexibility, and flexible ground insulation disposed around the outer periphery of the circular row of strands, each of said strands defining a helical path about the axis of the cable whereby all portions of the cable are transposed so as to have each strand successively occupy all positions in the cable relative to the stator both in the first and second cable portions and in the intermediate end turn portions.

12. A dynamoelectric machine comprising a rotor producing a magnetic field, a laminated stator core defining a cylindrical bore surrounding and radially spaced from said rotor, said stator also defining a plurality of substantially cylindrical holes extending axially through the stator core, a winding disposed in said holes and having a plurality of phase belts each comprising a single length of flexible multi-strand cable of substantially circular cross-section and having a first portion disposed in one of said holes, a second portion disposed in another of said spaced holes, and an intermediate portion connecting said first and second portions and forming one end turn of the phase belt, said cable including continuous flexible outer insulation both in the hole-lying portions and in the end turn portions, and leakage reactance control means comprising a plurality of longitudinal openings defined by the stator each connecting the bore with one of said holes along the stator length and having a circumferential width less than the hole diameter, whereby the reluctance of the stator core to the magnetic field produced by the rotor may be appropriately selected by determining the circumferential width of the opening, irrespective of the radial position of the conductor means in the stator relative to the rotor.

References Cited in the file of this patent

FOREIGN PATENTS

| 21,822 | Great Britain | of 1912 |
| 312,247 | Germany | May 21, 1919 |
| 459,729 | Great Britain | Jan. 14, 1937 |